(12) United States Patent
Kamimura (10) Patent No.: US 7,793,743 B2
(45) Date of Patent: Sep. 14, 2010

(54) CRAWLER ROBOT

(75) Inventor: Akiya Kamimura, Ibaraki (JP)

(73) Assignee: National Institute of Advanced Industrial Science and Technology, Tokyo (JP)

(*) Notice: Subject to any disclaimer, the term of this patent is extended or adjusted under 35 U.S.C. 154(b) by 584 days.

(21) Appl. No.: 11/715,927

(22) Filed: Mar. 9, 2007

(65) Prior Publication Data

US 2007/0209844 A1    Sep. 13, 2007

(30) Foreign Application Priority Data

Mar. 10, 2006    (JP) .............................. 2006-064991

(51) Int. Cl.
B62D 55/00    (2006.01)

(52) U.S. Cl. ....................... 180/9.32; 180/8.2

(58) Field of Classification Search ................. 180/8.1, 180/8.2, 9.32, 9.1, 9.3
See application file for complete search history.

(56) References Cited

U.S. PATENT DOCUMENTS

| | | | | | |
|---|---|---|---|---|---|
| 2,751,027 | A | * | 6/1956 | McLaughlin | 180/6.5 |
| 3,414,072 | A | * | 12/1968 | Hodges, Jr. et al. | 180/24 |
| 3,417,832 | A | * | 12/1968 | Ziccardi | 180/9.3 |
| 3,730,287 | A | * | 5/1973 | Fletcher et al. | 180/6.5 |
| 3,759,567 | A | * | 9/1973 | Steiner et al. | 296/63 |
| 4,709,773 | A | * | 12/1987 | Clement et al. | 180/9.32 |
| 4,727,949 | A | * | 3/1988 | Rea et al. | 180/9.32 |
| 5,335,741 | A | * | 8/1994 | Rabinovitz et al. | 180/8.2 |
| 5,337,846 | A | * | 8/1994 | Ogaki et al. | 180/8.2 |
| 5,650,579 | A | | 7/1997 | Hatley et al. | |
| 6,523,629 | B1 | * | 2/2003 | Buttz et al. | 180/167 |
| 6,837,318 | B1 | * | 1/2005 | Craig et al. | 180/6.7 |
| 2002/0062999 | A1 | * | 5/2002 | De-Noor et al. | 180/9.21 |

FOREIGN PATENT DOCUMENTS

DE    203 14 213 U1    11/2003

(Continued)

OTHER PUBLICATIONS

Shoval Shraga: "Stability of a Multi Tracked Robot Traveling Over Steep Slopes", Robotics and Automation, 2004; Proceedings; ICRA '04; 2004 IEEE International Conference on New Orleans, LA, USA, Apr. 26-May 1, 2004, Piscataway, NJ, USA, IEEE, US, Apr. 26, 2004, pp. 1-6, XP-002425893, ISBN: 0-7803-8232-3.

(Continued)

*Primary Examiner*—Lesley Morris
*Assistant Examiner*—Maurice Williams
(74) *Attorney, Agent, or Firm*—Sughrue Mion, PLLC (57) ABSTRACT

Disclosed is a crawler robot which, even of a small size, can climb over a high step and which can perform various aspects of operations. Rollers, are arranged at apexes of triangular frames, and elastic crawlers are wrapped around the rollers, with the two frames being connected by a central support shaft. Rotatably provided to the central support shaft is a one-joint link composed of a first link and a second link connected together by a rotation shaft. An end portion of the second link is rotatably connected with a front shaft of a subordinate crawler device equipped with crawlers wrapped around rollers. As a result, the crawler robot is composed of a triangular crawler device and the subordinate crawler device connected together by the one-joint link. The crawler robot can be operated by rotating and bending the link and by rotating the crawler devices in arbitrary directions.

14 Claims, 10 Drawing Sheets

FOREIGN PATENT DOCUMENTS

| | | |
|---|---|---|
| GB | 844768 A | 8/1960 |
| JP | 58-191673 A | 11/1983 |
| JP | 59-018072 A | 1/1984 |
| JP | 61-067678 A | 4/1986 |
| JP | 61-160366 A | 7/1986 |
| JP | 61-222879 A | 10/1986 |
| JP | 63-079282 U | 5/1988 |
| JP | 8-133141 A | 5/1996 |
| JP | 09-226637 A | 9/1997 |
| JP | 09-240520 A | 9/1997 |
| JP | 2004-224146 A | 8/2004 |
| JP | 2005-335681 A | 12/2005 |
| WO | WO 2005/105388 A1 | 11/2005 |

OTHER PUBLICATIONS

Shigeo Hirose et al.: Design and Control of a Mobile Robot With an Articulated Body, International Journal of Robotics Research, Sage Science Press, Thousand Oaks, U.S., vol. 9, No. 2, Apr. 1, 1990, pp. 99-114, XP000113586, ISSN: 0278-3649.

* cited by examiner

CRAWLER ROBOT

BACKGROUND OF THE INVENTION

1. Technical Field

Aspects of the present invention relate to a robot using crawlers as moving devices, and more particularly to a crawler robot having, on both sides of a robot main body, crawlers driven in a triangular form to thereby form a triangular crawler device, and further, including a small subordinate crawler device rotatably connected with the triangular crawler device by a link.

2. Related Art

Examples of the related art robots include stationary robots mainly installed in the production lines of plants, and movable robots equipped with moving devices of various types; the related art movable robots mainly adopt either a caterpillar type or a leg type moving system.

Generally speaking, vehicles travel by using tires as in the case of automobiles, or by using caterpillars formed of iron or rubber belts as in the case of tanks. The belts used in the latter type of traveling system are called crawlers (or crawler belts). In the case of traveling by using crawlers, the ground contact area is larger than in the case of traveling by using tires. Therefore, it is possible to markedly reduce the applied weight (ground contact pressure) per unit area. Thus, it is possible to prevent sinking of the vehicle body in a damp ground or a bad road, making it advantageously possible to secure a high level of traveling performance.

Movable robots are expected to be applied to rescue work and operations in extreme environments; thus, high mobility and high reliability are required of the traveling mechanism of a movable robot, which is expected to be capable of climbing over as high an obstacle as possible. For a movable robot to climb over a high obstacle, displacement of the center of gravity thereof is important, and, in this regard, various related art systems for movable robots of this type have been proposed.

JP 2005-335681 A discloses a robot having on both sides thereof crawlers arranged in a square form, and JP 08-133141 A discloses a crawler robot having one sprocket for driving a crawler belt, two sets of rotating wheels in each of which two rotating wheels are integrally rotatable around the same axis, and one triangular mechanism in which three rotating wheels are arranged at the apexes of an equilateral triangle so as to be rotatable around the center of gravity thereof; those are arranged at the apexes of a square which is of a configuration symmetrical with respect to a center line and which does not involve interference between the rotating motions of the above-mentioned components, around which the crawler belt is wrapped.

While capable of traveling on an irregular ground or the like, such a related art caterpillar type crawler robot as mentioned above involves a complicated mechanism to climb over, for example, a high obstacle, resulting in an increase in size and a problem in terms of energy consumption and mobility. Further, many crawler robots are of a structure vertically asymmetrical, so when turned upside down, they become incapable of operation.

SUMMARY OF THE INVENTION

Aspects of the present invention provide a crawler robot which is equipped with a center-of-gravity-displacement mechanism to be used when climbing over a high obstacle and which can be formed in an axial-rotational-symmetrical structure with no upside or downside in order to prevent the crawler robot from becoming substantially incapable of operation.

The exemplary embodiments include a multi-degree-of-freedom robot structure equipped with a triangular crawler device having on both sides thereof frames with two right and left triangular crawlers fixed to the same rotation shaft and a small subordinate crawler device of a standard configuration connected therewith by a link. Movement of the crawler robot is effected by caterpillars of the triangular crawler device and those of the subordinate crawler device. The triangular crawler device has a larger weight than the subordinate crawler device, so when climbing over an obstacle, the former is raised by the latter and the link to a higher position, and after traversing the obstacle, the small, subordinate crawler is raised by folding the link, whereby it is possible to climb over the obstacle and effect displacement of the center of gravity. Further, when an edge portion of the triangular crawler device is hooked on an obstacle by utilizing the rotation thereof around the rotation axis, it is possible to climb over a still higher obstacle. Further, for high speed movement, it is possible to realize a wheel movement of a large rotation radius by making the configuration of the triangular crawler device more substantially round. When a number of crawler robots of this type are prepared, and linked together by connecting the small, subordinate crawler of each of the robots to the rotation axis of another crawler robot, it is possible to realize a snake-like long movable robot structure, making it possible to climb over a substantially higher obstacle.

According to the exemplary embodiment, a crawler robot includes: a triangular crawler device having on both sides thereof crawlers wrapped around rollers arranged at apexes of triangular frames whose centers are connected together by a support shaft; a subordinate crawler device having on both sides thereof crawlers wrapped around at least two rollers of frames, which are connected together; and a link having at both ends thereof the support shaft of the triangular crawler device and the subordinate crawler device rotatably connected.

Further, according to the crawler robot, another crawler robot according to the exemplary embodiment is characterized in that the link is a one-joint link composed of a first link and a second link rotatably connected together.

Still further, another crawler robot according to the exemplary embodiment is characterized in that the triangular crawler device and the subordinate crawler device differ from each other in weight, and wherein the link rotates thereby displacing a center of gravity of the crawler robot as a whole.

Yet further, another crawler robot according to the exemplary embodiment is characterized in that the crawler robot can travel with both the triangular crawler device and the subordinate crawler device in contact with ground.

Yet further, another crawler robot according to the exemplary embodiment is characterized in that the link and the subordinate crawler device are accommodated within an outer peripheral edge of the triangular crawler device.

Moreover, another crawler robot according to the exemplary embodiment is characterized in that the crawler robot can travel with the subordinate crawler device raised by the triangular crawler device.

Furthermore, another crawler robot according to the exemplary embodiment is characterized in that the crawler robot can travel with the triangular crawler device raised by the subordinate crawler device.

Still furthermore, another crawler robot according to the exemplary embodiment is characterized in that the triangular crawler device is raised and placed on a step portion by the subordinate crawler device, and wherein the subordinate crawler device is raised up to the step portion by the triangular crawler device.

Yet furthermore, another crawler robot according to the exemplary embodiment is characterized in that the triangular frames are rotated around the support shaft to raise front portions of the surfaces of the triangular crawlers from ground, to thereby effect an operation of climbing over a step.

Yet furthermore, another crawler robot according to the exemplary embodiment is characterized in that the triangular crawler device is raised and placed on a step portion by the subordinate crawler device, and wherein the subordinate crawler device is raised up to the step portion by the triangular crawler device.

Yet furthermore, another crawler robot according to the exemplary embodiment is characterized in that the subordinate crawler device applies a pressure from a rear side, to substantially grip the surfaces of the triangular crawlers in contact with the ground, thereby configured to climb over a high step.

Further, another crawler robot according to the exemplary embodiment is characterized in that the triangular crawler device is provided with crawler guides for causing the crawlers to protrude from within, which are retractable at midpoints of the three sides of the triangular crawler device.

Still further, another crawler robot according to the exemplary embodiment is characterized in that with the crawler guides protruding, the crawler robot can travel through rotation of the frames of the triangular crawler device about the support shaft.

Yet further, another crawler robot according to the exemplary embodiment is characterized in that the subordinate crawler device is equipped with a connecting means for connecting with another crawler robot, making it possible to bead together a plurality of crawler robots.

As described above, a center-of-gravity-displacement mechanism is used in which the triangular crawler device and the subordinate crawler device are connected by a link, whereby it is possible to climb over a higher step as compared with the related art techniques. In particular, when a one-joint link is adopted, and the representative dimension in the height direction is the height of the triangular crawler, it is possible to climb over a step of approximately up to 1.5 times the dimension, which is much higher as compared with the height that can be overcome by the conventional movable robots, which can only climb over a step whose height is approximately 0.5 times the dimension. Thus, even when the height of the triangular crawler portion is approximately 20 cm, it is possible to easily climb over a step or an obstacle of a height in the range of normal human activity; otherwise, it is possible to operate the movable robot in various aspects, such as movement in a generally compact structure. Further, by making the link connecting the triangular crawler device with the subordinate crawler device foldable, it is possible to climb over a still higher step. Further, even when turned upside down, the robot is can be restored to the former state through cooperation of the triangular crawler device and the subordinate crawler device.

Thus, it is possible for a small crawler robot to climb over a high step, and further, to perform operations in various aspects without becoming substantially incapable of operation by virtue of a construction in which crawlers wrapped around rollers arranged at the apexes of triangular frames are provided on the right and left sides, with the center of the frames being connected by a support shaft to form a triangular crawler device, and in which crawlers wrapped around at least two rollers of frames are provided on the right and left sides to form a subordinate crawler device by connecting together the frames, with a support shaft of the triangular crawler device and the subordinate crawler device being rotatably connected with both ends of a link.

BRIEF DESCRIPTION OF THE DRAWINGS

In the accompanying drawings:

FIGS. 2A and 2B are diagrams illustrating another operational aspect of the exemplary embodiment, of which

FIGS. 3A through 3C are diagrams illustrating still another operational aspect of the exemplary embodiment, of which

DESCRIPTION OF THE EXEMPLARY EMBODIMENTS

Embodiment 1

Figure 1A:
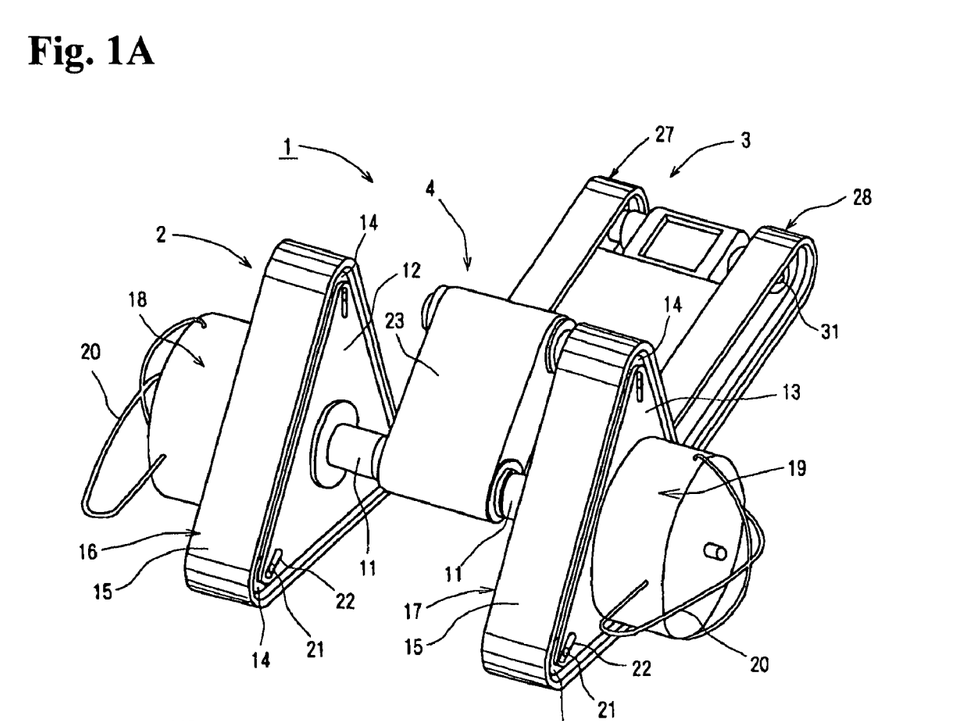
FIGS. 1A and 1B are perspective views illustrating an operational aspect of an exemplary embodiment.
Figure 1B:
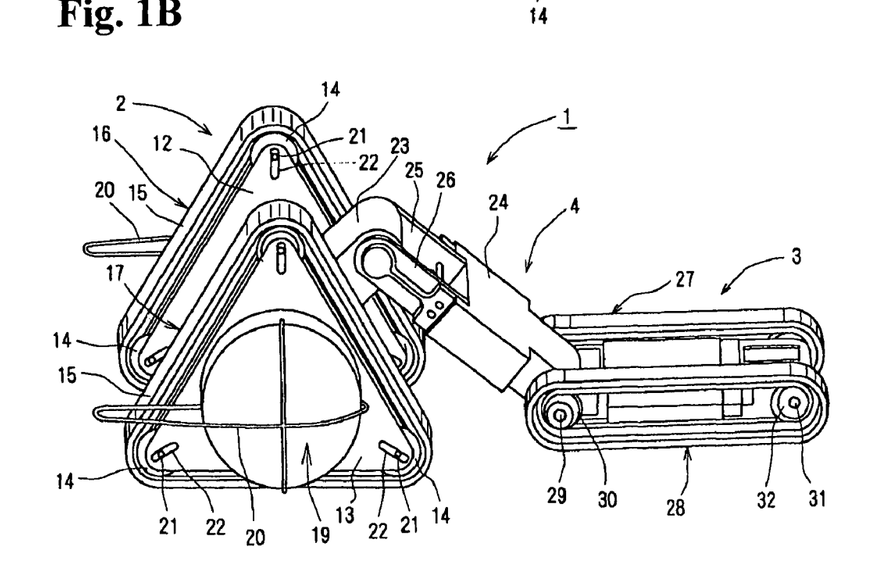

An embodiment of the present invention will be described with reference to the drawings. FIGS. 1A and 1B are perspective views showing one of various operational aspects of a crawler robot according to the exemplary embodiment, in which there is used a one-joint link composed of two links rotatably connected together. As described below, a crawler robot 1 is composed of a triangular crawler device 2 having triangular crawlers on both sides thereof, a subordinate crawler device 3 having standard type small crawlers on both sides thereof, and a one-joint link 4 connecting together the triangular crawler device 2 and the subordinate crawler device 3.

In the triangular crawler device 2, both ends of a central support shaft 11 are supported by frames, each of which is composed of an inner triangular frame 12 and an outer triangular frame 13, with rollers 14 being provided at the apex portions of the frames. Elastic crawlers 15 formed of an elastic material such as rubber and serving as caterpillars are wrapped around the rollers, forming triangular crawlers, which are substantially triangular. At least one of the three rollers 14 supporting each triangular crawler is driven by a motor, whereby the elastic crawlers 15 circulate around the rollers 14 in a triangular form, enabling the crawler robot to advance, retreat, or stop by virtue of a frictional force generated at the surfaces of the elastic crawlers 15 in contact with the ground.

A first triangular crawler 16 on one side and a second triangular crawler 17 on the other side can be driven independently, circulating the crawlers in the same direction or in opposite directions; further, it is also possible to cause only one crawler to advance or retreat, with the other kept at rest. As stated above, at least one of the rollers 14 of each triangular crawler is driven by a motor; although not shown, the motor is arranged within each of the frames, between the outer triangular frame 13 and the inner triangular frame 12, as would be understood by one skilled in the art. A support shaft 21 of each roller 14 is movable within a radial guide groove 22 formed in the inner triangular frame 12 and the outer triangular frame 13, making it possible to effect positional adjustment, etc. On the outer sides of the outer triangular frames 13, there are respectively arranged a first sensor case 18 and a second sensor case 19, which are rotatable with respect to the support shaft 11, with the peripheries of the sensor cases being protected by guards 20 serving also as tactile sensors. By thus arranging the sensor cases on the outer sides, it is possible to replace them by sensor cases adapted to the operation to be performed and the environment or replace them by operating arms or the like.

In the exemplary embodiment, one end of a first arm 23 constituting the one-joint link 4 is rotatably supported at the intermediate portion of the central support shaft 11. At the other end of the first arm 23, a second arm 24 is rotatably supported; the second arm 24 can be arbitrarily rotated by a motor around an inner connection shaft with respect to the first arm 23, thereby forming the one-joint link 4. Support arms 25 and 26 are provided on both sides of the end portion of the second arm 24 so that the first arm 23 and the second arm 24 can rotate within a range, whereby a rotation space is defined between the two arms, with the first arm 23 being rotatably supported by a rotation shaft provided at the forward ends of the support arms 25 and 26.

Rotatably supported at the other end of the second arm 24 is a front shaft 29 of the subordinate crawler device 3, which has on both sides thereof a first standard crawler 27 and a second standard crawler 28 which are small and of a standard type that have been widely used and in each of which a crawler is stretched between at least two rollers. The subordinate crawler device 3 is arbitrarily rotatable with respect to the second arm 24 by a motor (not shown) directly connected to the connection shaft 29 arranged inside the other end portion of the second arm 24. The first standard crawler 27 and the second standard crawler 28 are both stretched between a roller 30 provided on the front shaft 29 connected with the one-joint link 4 and a roller 32 provided on a rear shaft 31, and can be operated in the substantially same manner as related art crawlers by a motor (not shown) directly connected to the rear shaft 31.

The crawler robot 1 described above can be used as a multi-degree-of-freedom robot that can be operated in various aspects as shown in FIGS. 2A through 9. As shown in FIG. 2B, which is a frame drawing, in the operational aspect shown in FIGS. 2A and 2B, the first arm 23 of the one-joint link 4 extending from the central support shaft 11 of the triangular crawler device 2 is rotated to a first corner portion 35 of the triangular crawler device 2; the second arm 24 is bent around a rotation shaft 36 constituting the joint of the one-joint link 4; the end portion supporting the subordinate crawler device 3 is rotated toward a second corner portion 37 of the triangular crawler device 2; and the portion of the subordinate crawler device 3 which extends from the front arm 29 to the rear shaft 31, supported by the second arm 24, is rotated so as to be situated at a third corner portion 38 side, whereby the one-joint link 4 and the subordinate crawler device 3 are accommodated within the outer peripheral edge of the triangular crawler device 2. As a result, the crawler robot 1 can make a movement such as advancement, retreat, or rotation through the driving of the triangular crawler device 2 in a most compact form as a whole.

Figures 3A, 3B, 3C:
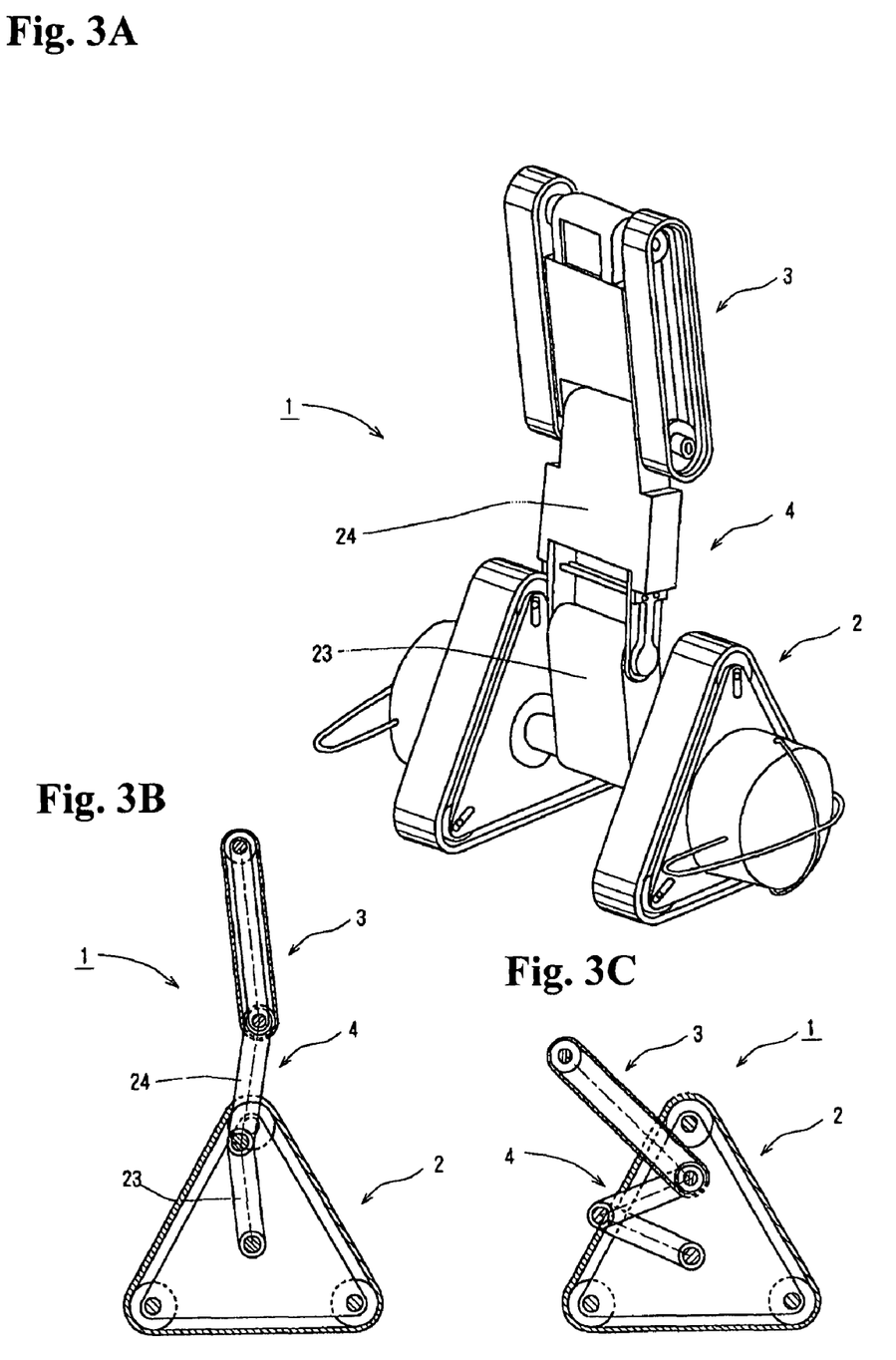
FIG. 3A is a perspective view.
FIG. 3B is a conceptual drawing.
FIG. 3C is a conceptual drawing illustrating another operational aspect.

In the operational aspect shown in FIGS. 3A through 3C, the triangular crawler device 2 supports through the intermediation of the one-joint link 4 of the subordinate crawler device 3 at a position above the same; in the example shown in FIG. 3A, which is a perspective view, and FIG. 3B, which is a schematic view, the one-joint link 4 is extended with respect to the triangular crawler device 2 to support the subordinate crawler device 3, which is also extended upwardly, with the result that the crawler robot assumes the substantially highest position. As shown in FIG. 3C, in this aspect, the one-joint link 4 is further bent to bend the subordinate crawler 3 to support the subordinate crawler device 3 in a similarly bent fashion, whereby, with the height of the crawler robot as a whole being reduced, it is possible to upwardly support and move the subordinate crawler device 3 by the triangular crawler device 2.

Figure 4:
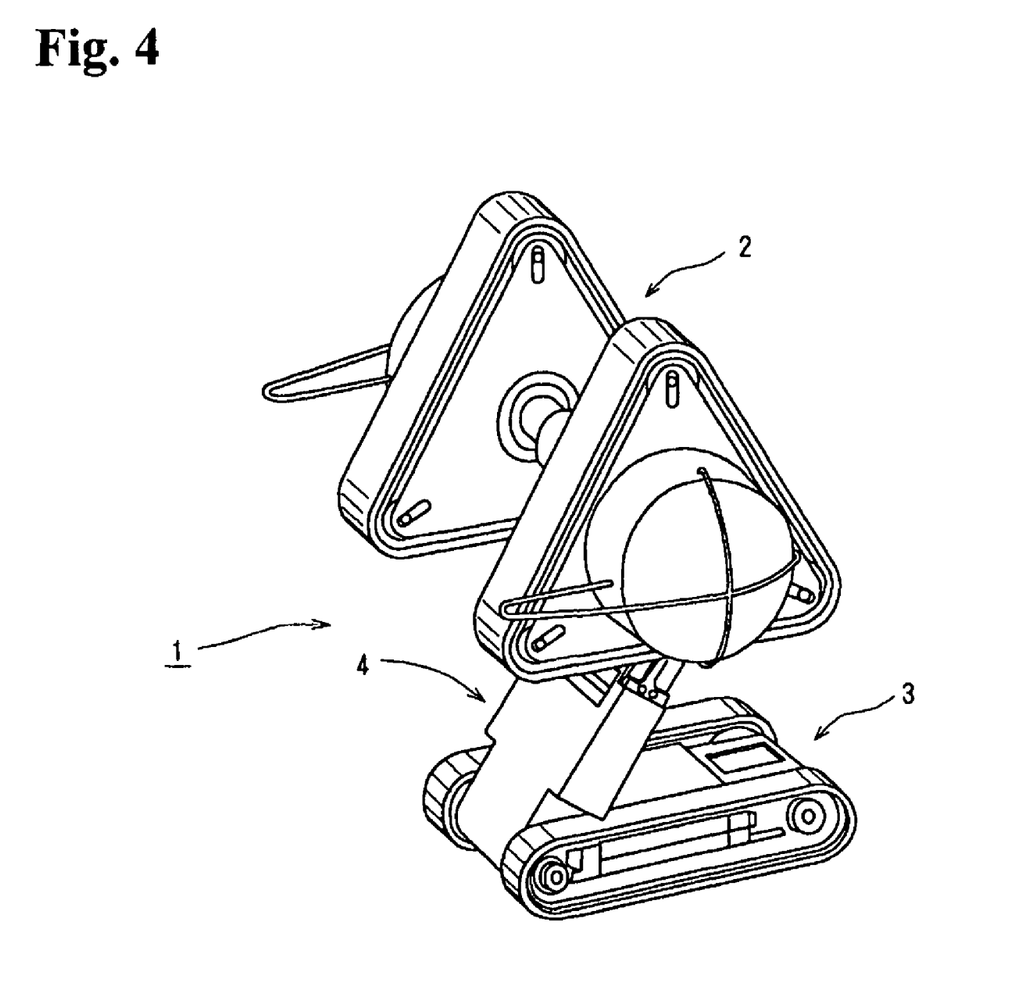
FIG. 4 is a perspective view illustrating yet another operational aspect of the exemplary embodiment.

Conversely to the operational aspect of FIGS. 3A through 3C, in the operational aspect shown in FIG. 4, traveling is possible with the triangular crawler device 2 supported above the subordinate crawler device 3. That is, with the subordinate crawler device 3 being in a traveling aspect, the second arm 24 of the one-joint link 4 is bent sufficiently backwards to support the first arm substantially upwards, whereby the center of gravity of the triangular crawler device 2 is substantially positioned directly above the center of gravity of the subordinate crawler device 3, making it possible to perform traveling by the subordinate crawler device 3 in a stable state. Thus, when the triangular crawler device 2 becomes substantially incapable of traveling, traveling is possible by the subordinate crawler device 3, and further, it is possible to perform various other operations.

Figure 5:
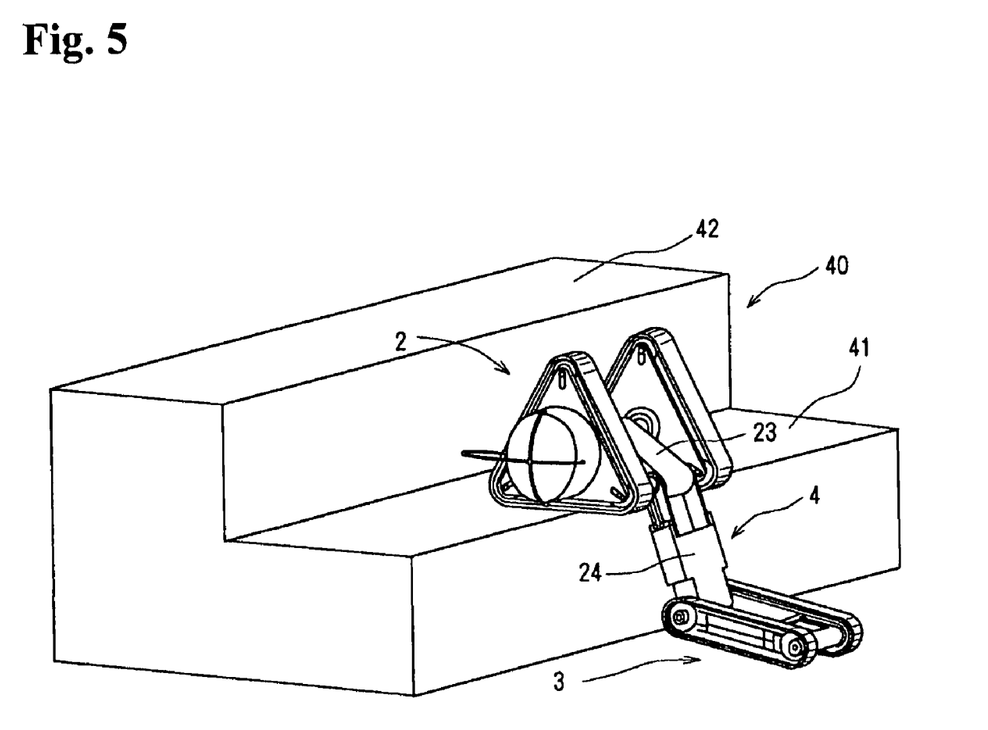
FIG. 5 is a perspective view illustrating an operational aspect of the exemplary embodiment when a step portion is to be climbed over.

In the operational aspect shown in FIG. 5, with the triangular crawler device 2 being supported by the subordinate crawler device 3 in the operational aspect of FIG. 4, the crawler robot travels to a step-like structure 40, and the triangular crawler device 2 is raised by extending the one-joint link 4, placing it on a first step portion 41 of the step-like structure 40. Since the weight of the triangular crawler device 2 is sufficiently larger than that of the subordinate crawler device 3, when the triangular crawler device 2 is rotated in this state in a bent fashion so as to be reversed through reversal of the one-joint link 4, it is possible to perform the operation of raising the subordinate crawler device 3 and placing it on the first step portion 41. By repeating this, it is possible to travel while climbing over various obstacles.

Figure 6:
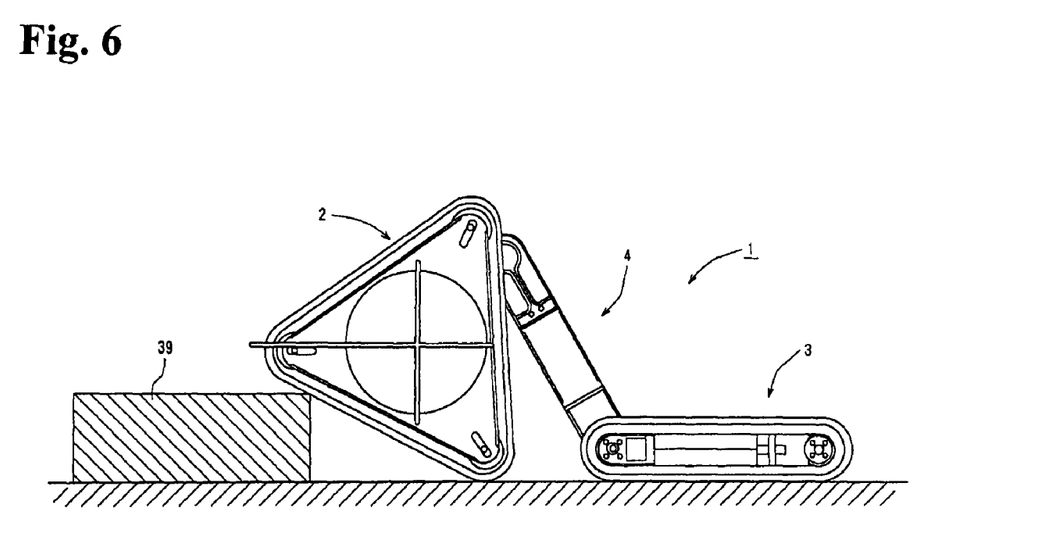
FIG. 6 is a perspective view illustrating another operational aspect of the exemplary embodiment when a step portion is to be climbed over.

In the operational aspect shown in FIG. 6, the crawler robot travels to a low step 39 through the substantially same operation as in the operational aspect of FIG. 1, and the triangular crawler device 2 is rotated around the support shaft 11 to raise from the ground the forward portions of the surfaces of the crawlers that have been in contact with the ground, thereby making it possible to climb over the step 39.

Figure 7A:
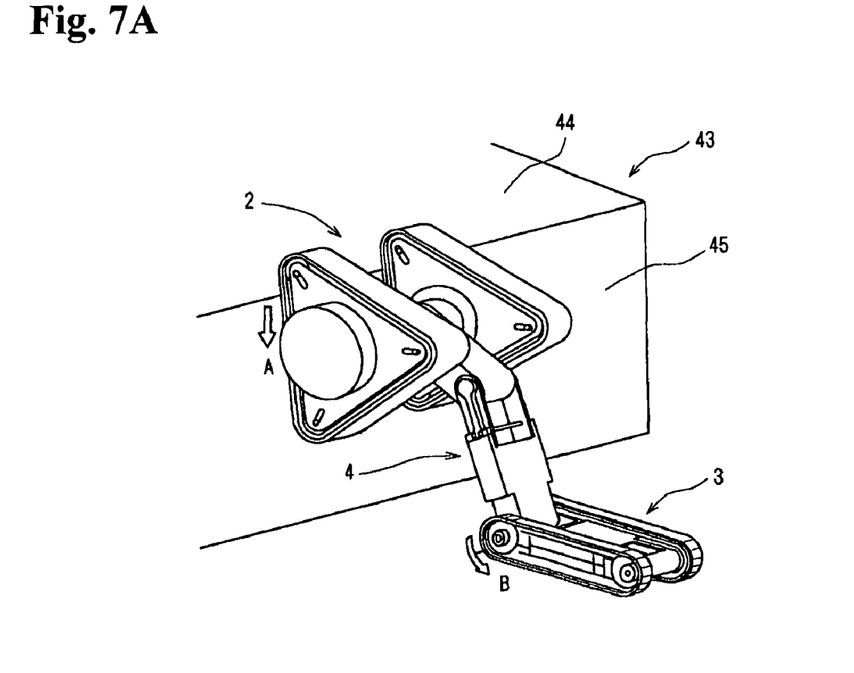
FIGS. 7A and 7B are diagrams illustrating an operational aspect of the exemplary embodiment when a relatively high step is to be climbed over.
Figure 7B:
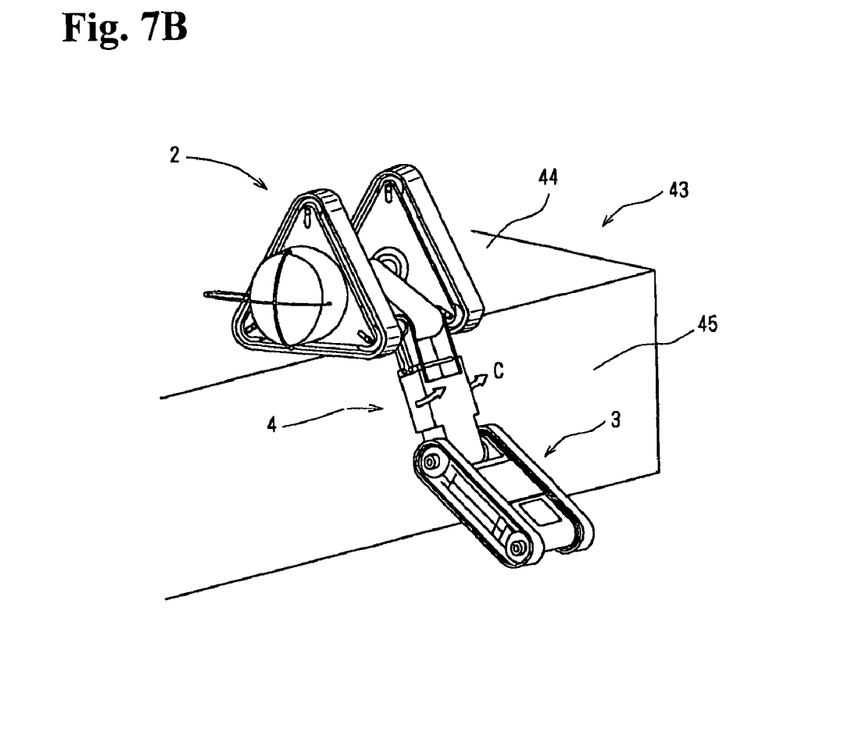

While in the operational aspect shown in FIG. 5 the above-mentioned operation is possible since the first step portion 41 is relatively low, when, as shown, for example, in FIGS. 7A and 7B, the upper portion of a structure 43, or a step portion 44, is relatively high, and the subordinate crawler device 3 is totally in contact with the ground, it may occur that the triangular crawler device 2 cannot be placed on the step portion 44 in the operational aspect of FIG. 5 by simply raising the triangular crawler device 2. In this regard, in the aspect shown in FIGS. 7A and 7B, the triangular crawler device 2 is pressed against a wall 45 of the structure 43 with the urging force exerted toward the wall 45 through the forward movement of the subordinate crawler device 3, and the triangular crawler device 2 is driven in the direction of an arrow A in FIG. 7A while being gripped, and caused to move upwards on the vertical wall 45, and at the same time, the subordinate crawler device 3 is driven in the direction of an arrow B to advance, whereby the triangular crawler device 2 can move upwardly on the vertical wall 45. As a result, as shown in FIG. 7B, the triangular crawler device 2 can be moved onto the step portion 44 of the structure 43. Further, as needed, the triangular crawler device 2 reverses and rotates the one-joint link 4 in the direction of an arrow C, whereby the subordinate crawler device 3 is raised and moved onto the step portion 44, thus making it possible to move the entire crawler robot 1 onto the step portion 44.

Figure 2A:
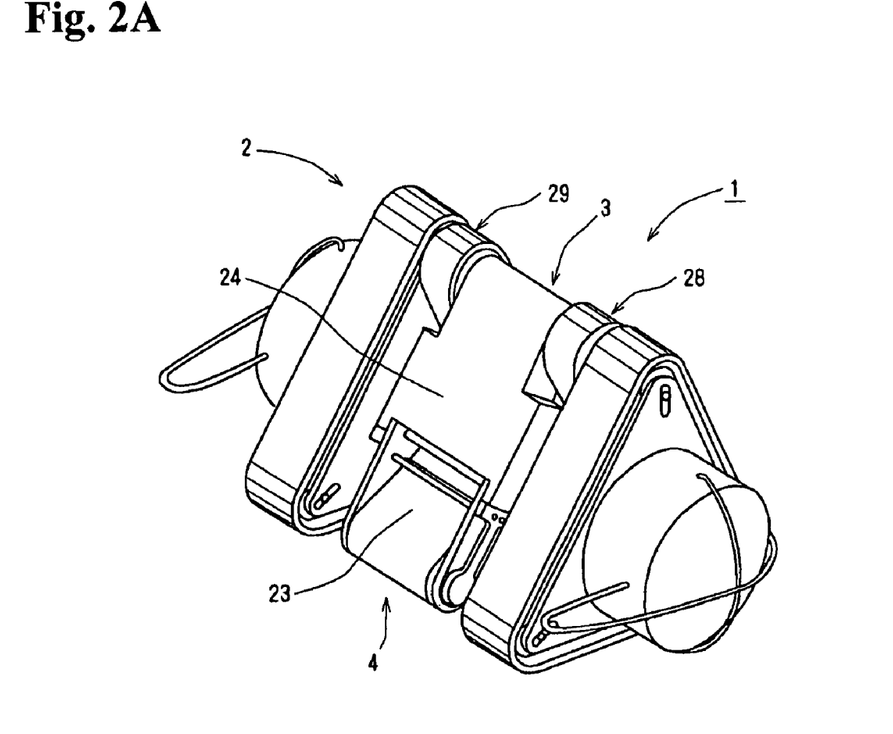
FIG. 2A is a perspective view and FIG. 2B is a conceptual drawing.
Figure 2B:
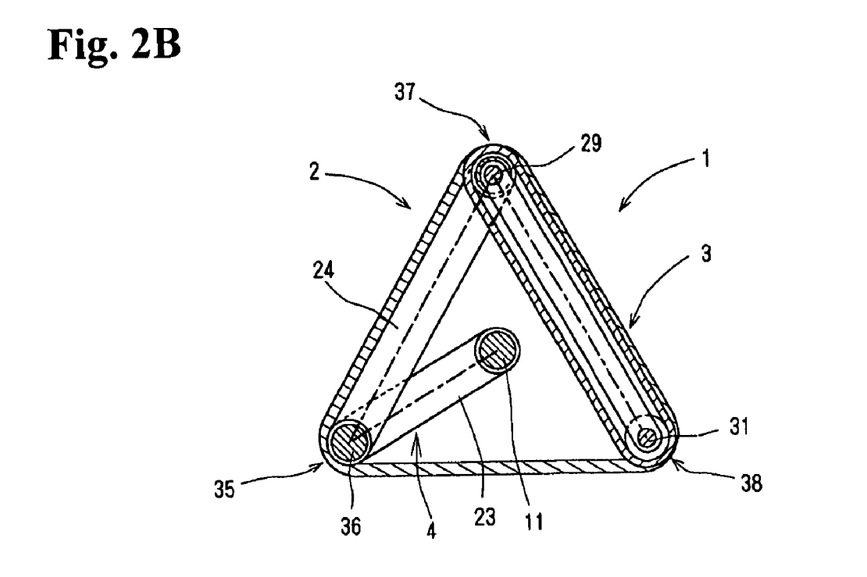
Figure 8:
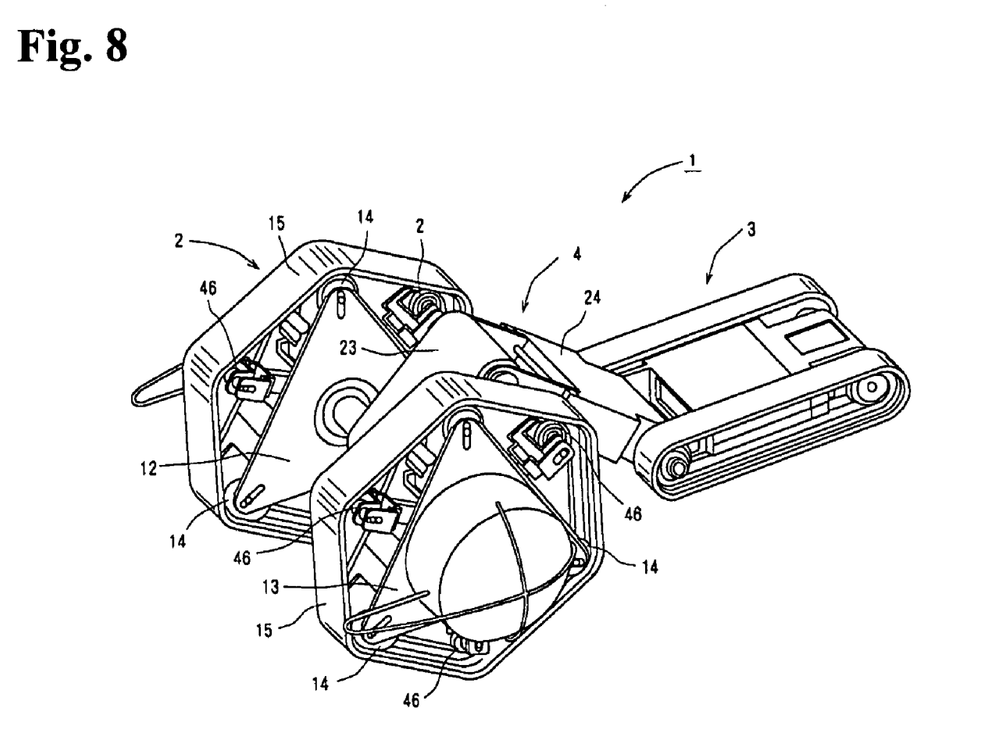
FIG. 8 is a diagram illustrating an operational aspect of the exemplary embodiment in which guide rollers are caused to protrude from within a triangular crawler device to effect traveling in a manner analogous to that of wheels.

While in the above-mentioned exemplary embodiments the elastic crawlers of the triangular crawler device 2 are run along the configuration of the triangular frames, it is also possible to arrange expandable crawler guides 46 within the triangular frames and at the respective centers of the sides of the triangles, and to cause them to protrude from the triangular frames to expand the elastic crawlers 15 as shown in FIG. 8, whereby it is possible to turn the crawler robot into a hexagonal crawler robot; in this state, the triangular frames 12 and 13 are rotated around the central support shaft 11, whereby it is possible to drive and rotate them like wheels, making it possible, in particular, to effect high speed movement as in the case of large-diameter wheels. In this case, it is not necessary for the subordinate crawler device 3 to perform traveling; when it is accommodated within the outer peripheral edge of the triangular frames as in the operational aspect of FIG. 2, it is possible to effect movement at a still higher speed. Further, by providing a still larger number of the crawler guides 46, it is possible to realize a configuration substantially closer to a circle. In this aspect also, it is possible to effect movement through the driving of the crawlers.

Figure 9:
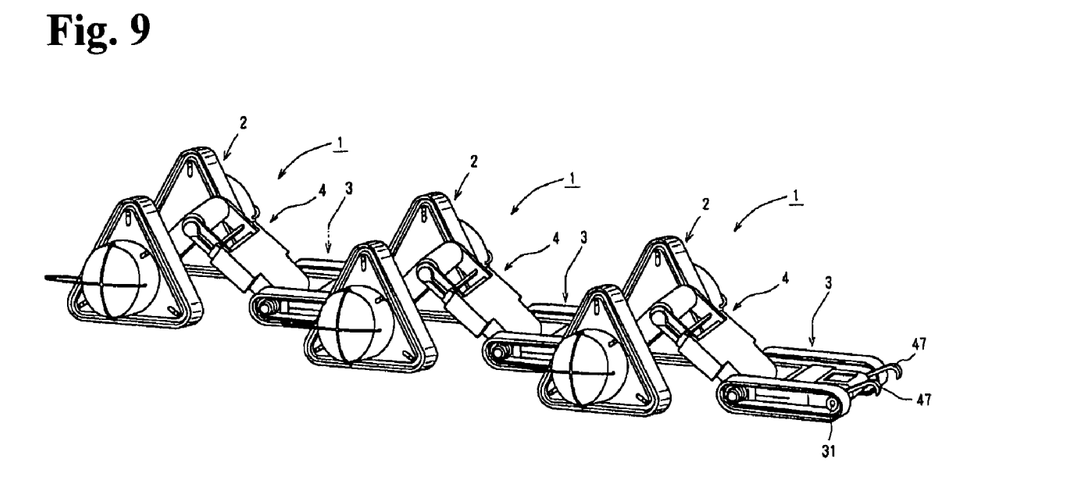
FIG. 9 is a diagram illustrating another exemplary embodiment, in which traveling is effected with a plurality of crawler robots linked together.

While in the above-mentioned embodiments the crawler robot 1, which is composed of the triangular crawler device 2, the subordinate crawler device 3, and the one-joint link 4 connecting them together, is operated singly, it is also possible, as shown, for example, in FIG. 9, to link a plurality of crawler robots with each other, thus realizing a snake-like movable robot structure. For this linkage, as shown in the rearmost subordinate crawler device of FIG. 9, right and left hooks 47 are rotatably provided on the rear shaft 31; normally, the hooks are accommodated in the subordinate crawler device through forward rotation; when a need for linkage arises, the hooks are rotated rearwards, and are hooked for linkage on the central support shaft 11, etc. of the triangular crawler device 2 of the succeeding crawler robot. This linkage device can be realized in various aspects by utilizing well-known techniques.

While in the above-mentioned exemplary embodiments the triangular crawler device 2 and the subordinate crawler device 3 are connected together by the one-joint link 4 composed of the first link and the second link that are rotatably connected together, the connection between the triangular crawler device and the subordinate crawler device may be effected by various other types of links or equivalent objects; for example, as shown in FIGS. 10A through 10D, operation is possible in various aspects as in the above-mentioned embodiments if the connection is effected by one link 54. In the example shown in FIG. 10A, an operational aspect similar to that of FIG. 1 is selected; in a crawler robot 51, a triangular crawler device 52 and a subordinate crawler device 53 are connected together by the link 54, with both crawler devices being in contact with the ground.

Figure 10A:
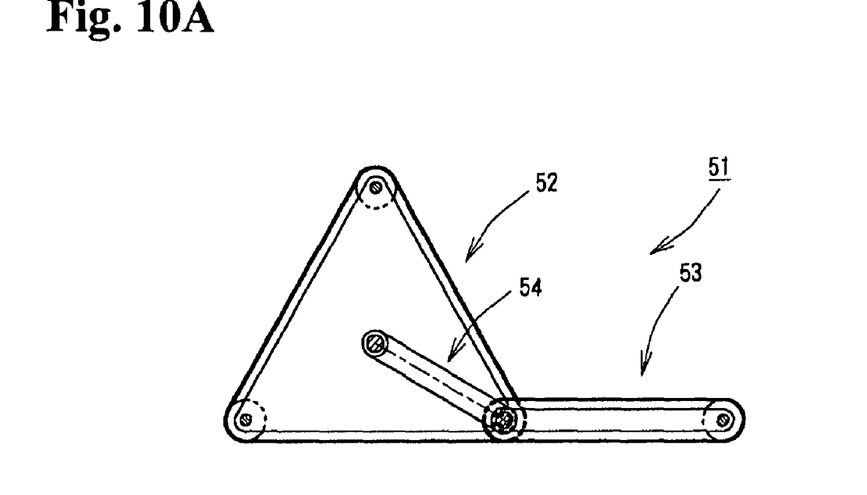
FIGS. 10A through 10D are conceptual drawings illustrating still another exemplary embodiment, showing various operational aspects thereof.
Figure 10B:
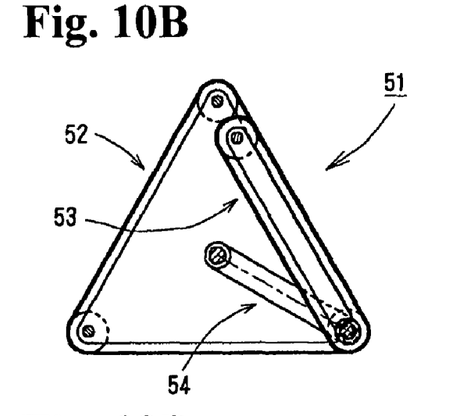
Figure 10C:
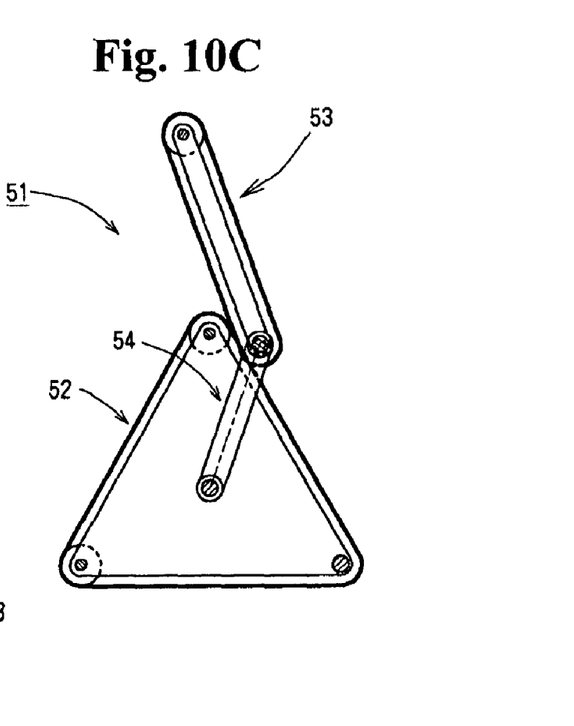
Figure 10D:
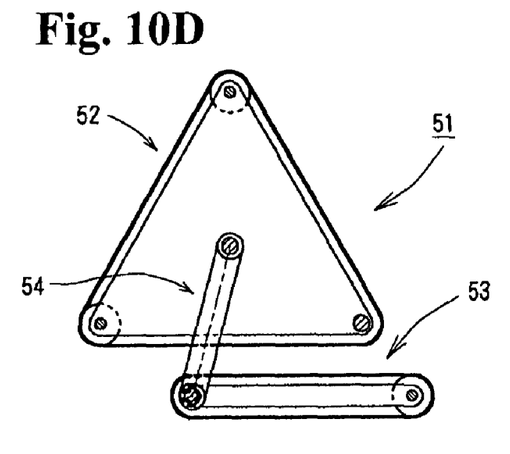

In the example shown in FIG. 10B, an operational aspect similar to that of FIG. 2 is selected; that is, the link 54 and the subordinate crawler device 53 are accommodated within the outer peripheral edge of the triangular crawler device 52. In the example shown in FIG. 10C, an operational aspect similar to that of FIG. 3 is selected; that is, the subordinate crawler device 53 is raised with respect to the triangular crawler device 52. In the example shown in FIG. 10D, an operational aspect similar to that of FIG. 4 is selected; that is, the triangular crawler device 52 is raised by the subordinate crawler device 53. In those exemplary operational aspects, it is further possible to perform operations similar to those of FIGS. 5 and 7. Further, it is possible for the crawler robot 51 to perform the operations as shown in FIGS. 8 and 9.

While in the above-mentioned embodiments the triangular crawler device and the subordinate crawler device are connected by a one-joint link or a simple link, it is also possible to employ a link having two, three or more joints, with the link being arbitrarily expandable. When there is no need to select the operational aspect as shown in FIG. 8, it is possible to employ, apart from steel bands, bands formed of various materials, as the crawler material.

The present inventors have produced a crawler robot using a triangular crawler device as shown in FIG. 1 having a height of about 20 cm, and conducted various operations therewith, succeeding in experiments of moving the robot in all directions through remote control, rotating the robot on the spot, and causing the robot to climb over a step having a height of about 32 cm and to go up and down steps. However, as would be understood by one skilled in the art, the present invention is not limited to these sizes.

In the exemplary embodiments, it is possible to climb over a step about 32 cm high even when the height of the triangular crawler device is approximately 20 cm, thus making it possible to climb over steps within a range of human activity; further, due to its small size, the crawler robot can be widely applied, for example, to the following uses, singly or in a combination of a plurality of crawler robots cooperating in terms of information by utilizing radio communications:

A. Applications when the crawler robot is used singly include:
Nighttime patrolling of department stores, office buildings, museums, etc.;
Break monitoring for home security uses, etc.;
Navigation in showrooms and amusement parks;
Walking aid for visually handicapped or aged persons; and
Uses as education platforms, with the sensor type, etc. changed as appropriate.

B. Applications in the case of a combination of a plurality of crawler robots cooperating in terms of information by using radio communication, include:
Collecting information when a disaster or a terrorist attack occurs in a public space such as a department store, an underground shopping center, or a subway platform;
Collection of field data on large-scale farms;
Detection and removal of mines, with a metal detector or the like added as appropriate; and
Rescue work after a disaster such as tsunami or earthquake.

What is claimed is:
1. A crawler robot, comprising:
a triangular-shaped crawler device having parallel triangular frames on respective sides thereof with three rollers respectively arranged at apexes of the frames, crawlers being wrapped around said rollers, wherein the crawlers comprise three rigid components which form a triangle, and a support shaft connecting respective centers of the frames;

a subordinate crawler device having crawlers on both sides and being wrapped around rollers of subordinate crawler device frames that are connected to each other, said rollers are arranged at center axes of subordinate crawler device frames;

a link having first and second arms rotatably connected to each other with an axis of rotation parallel with the support shaft of the triangular-shaped crawler device, said link having one end fixed on the support shaft of the triangular-shaped crawler device and another end rotatably connected to the subordinate crawler device, such that a rotating shaft of the subordinate crawler device is parallel to the support shaft of the triangular-shaped crawler device, whereby the crawler robot can be formed into three symmetrical sides; and at least one motor configured to drive the crawlers of the triangular-shaped crawler device and the crawlers of the subordinate crawler device and arms of the link independently of each other, wherein the link and the subordinate crawler device are accommodatable within an outer peripheral edge of the triangular crawler device.

2. The crawler robot according to claim 1, wherein the triangular crawler device and the subordinate crawler device substantially differ in weight, and wherein the link rotates about the shaft thereby displacing a center of gravity of the crawler robot.

3. The crawler robot according to claim 1, wherein the triangular crawler device and the subordinate crawler device are arranged to permit the crawler robot to travel with the triangular crawler device and the subordinate crawler device in contact with the ground.

4. The crawler robot according to claim 1, wherein the triangular crawler device is operable to support the subordinate crawler device through the link, whereby the crawler robot travels through the crawlers of the triangular crawler device.

5. The crawler robot according to claim 1, wherein the subordinate crawler device is operable to support the triangular crawler device by extending the link, whereby the crawler robot is raised by the subordinate crawler device.

6. The crawler robot according to claim 1, wherein with the triangular crawler device raised and placed on a step portion by the subordinate crawler device, the subordinate crawler device can be raised to the step portion by the triangular crawler device.

7. The crawler robot according to claim 1, wherein the triangular frames are rotatable around the support shaft to raise front portions of the surfaces of the triangular crawlers from ground, to thereby effect an operation of climbing over a step.

8. The crawler robot according to claim 7, wherein the subordinate crawler device is arranged to apply a pressure from a rear side, to substantially grip the surfaces of the triangular crawlers in contact with the ground, whereby the crawler robot is configured to climb over a high step.

9. The crawler robot according to claim 1, wherein the triangular crawler device is provided with crawler guides for causing the crawlers to protrude from within, which are retractable at midpoints of the sides of the triangular crawler device.

10. The crawler robot according to claim 9, wherein, with the crawler guides protruding, the crawler robot can travel through rotation of the frames of the triangular crawler device about the support shaft.

11. The crawler robot according to claim 1, wherein the subordinate crawler device is equipped with a connecting means for connecting with another crawler robot, and configurable to bead together a plurality of crawler robots.

12. The crawler robot of claim 1, wherein the link and the subordinate crawler device are rotatable 360 degrees freely with respect to the support shaft of the triangular-shaped crawler device.

13. The crawler robot of claim 1, wherein the link may be accommodated in a folded configuration to reside within the triangular crawler device.

14. A crawler robot, comprising:

a triangular-shaped crawler device having parallel triangular frames on respective sides thereof with three rollers respectively arranged at apexes of the frames, crawlers being wrapped around said rollers, and a support shaft connecting respective centers of the frames;

a subordinate crawler device having crawlers on both sides and being wrapped around rollers of subordinate crawler device frames that are connected to each other, said rollers are arranged at center axes of subordinate crawler device frames;

a link having first and second arms rotatably connected to each other with an axis of rotation parallel with the support shaft of the triangular-shaped crawler device, said link having one end fixed on the support shaft of the triangular-shaped crawler device and another end rotatably connected to the subordinate crawler device, such that a rotating shaft of the subordinate crawler device is parallel to the support shaft of the triangular-shaped crawler device, whereby the crawler robot can be formed into three symmetrical sides;

at least one motor configured to drive the crawlers of the triangular-shaped crawler device and the crawlers of the subordinate crawler device and arms of the link independently of each other, wherein the link and the subordinate crawler device are accommodatable within an outer peripheral edge of the triangular crawler device; and wherein the subordinate crawler device is operable to support the triangular crawler device by extending the link, whereby the crawler robot is raised by the subordinate crawler device.

* * * * *